United States Patent [19]
Jackson

[11] Patent Number: 5,154,726
[45] Date of Patent: Oct. 13, 1992

[54] SOLID FUMARIC ACID-SOLID BARIUM CHROMATE CATALYST FOR REMOVING IMPURITIES AND RESIDUAL MOISTURE AND METHOD FOR ITS USE

[76] Inventor: Herman R. Jackson, 1550 Selva Marina Dr., Atlantic Beach, Fla. 32233

[21] Appl. No.: 657,941

[22] Filed: Feb. 21, 1991

Related U.S. Application Data

[63] Continuation of Ser. No. 436,272, Nov. 14, 1989, abandoned, which is a continuation-in-part of Ser. No. 308,590, Feb. 10, 1989, abandoned, and a continuation-in-part of Ser. No. 308,591, Feb. 10, 1989, abandoned.

[51] Int. Cl.$^5$ .................................. D06L 1/10
[52] U.S. Cl. ................................. 8/142; 210/689; 210/763; 210/765
[58] Field of Search .............. 8/141, 142; 210/755, 210/758, 762, 763, 765, 167, 689

[56] References Cited

U.S. PATENT DOCUMENTS

| | | | |
|---|---|---|---|
| 2,967,084 | 1/1961 | Reitz | 8/142 |
| 3,766,075 | 10/1973 | Jackson | 8/142 |
| 4,077,878 | 3/1978 | Jackson | 210/507 |
| 4,193,765 | 3/1980 | Jackson | 210/765 |

Primary Examiner—Peter Hruskoci
Attorney, Agent, or Firm—Sughrue, Mion, Zinn, Macpeak & Seas

[57] ABSTRACT

Disclosed is a catalyst composition comprising a mixture of solid fumaric acid and solid barium chromate useful in removing impurities and residual moisture from such sources as organic drycleaning solvents and petroleum fuels, and methods of using the catalyst composition.

6 Claims, 2 Drawing Sheets

SOLID FUMARIC ACID-SOLID BARIUM CHROMATE CATALYST FOR REMOVING IMPURITIES AND RESIDUAL MOISTURE AND METHOD FOR ITS USE

CROSS-REFERENCE TO RELATED APPLICATIONS

This application is a continuation of my co-pending U.S. applic. Ser. No. 07/436,272, filed Nov. 14, 1989, now abandoned which is a continuation-in-part of my co-pending U.S. applic. Ser. Nos. 07/308,590 and 07/308,591, both field Feb. 10, 1989 now abandoned.

FIELD OF INVENTION

The present invention concerns a novel and useful catalyst composition which is used in removing impurities and residual moisture from various sources.

The present invention more particularly concerns improving the cleaning properties of organic solvents used in drycleaning operations, and specifically, concerns improving the cleaning properties of such organic drycleaning solvents by removing residual moisture therefrom as well as sulfur and other residual reducing agents by the oxidation of the same.

The catalyst composition of the present invention can also be particularly used in reducing the emissions produced by burning fuel oils, gasolines or diesel fuels in automobile engines. More particularly, the catalyst of the present invention can be used in reducing these emissions by pre-treating the fuel with the catalyst prior to burning by removing sulfur therefrom as well as residual moisture and other residual reducing agents.

BACKGROUND OF THE INVENTION

In commercial drycleaning operations, various types of organic solvents have been employed in the past in the drycleaning process to remove soils from fabrics and clothing. For example, solvents such as halogen-substituted aliphatic hydrocarbons such as perchloroethylene (tetrachloroethylene), mineral spirits, various types of petroleum solvents, mixtures of hydrocarbon and halogen-substituted hydrocarbon solvents with detergents, and the like, have been employed. Typically, the petroleum solvents employed in the drycleaning operations have a boiling point in the range of from about 200° to about 400° F. and a surface tension of from about 20 to about 30 dynes/cm at room temperature (i.e. 20° C.). A typical formulation of a halogenated hydrocarbon solvent-detergent combination is manufactured by DuPont and sold under the trade name Valclene, which is a combination of fluorocarbon solvent and a special high-performance detergent with a boiling point of about 118° F., and a density of about 13-16 pounds per gallon at 68° F. and a surface tension at 68° F. of about 20 dynes/cm. A suitable fluorocarbon solvent is trichlorotrifluoroethane as the solvent constituent for Valclene.

Other solvents such as carbon tetrachloride and methylisobutylketone have also been employed in the past in commercial drycleaning operations. Due to the good stability and relatively high cost of these solvents, they are naturally reused and continuously recycled in the drycleaning process, and thus it becomes desirable to recondition the solvents by removing residual moisture, sulfur, and other residual reducing agents therefrom in order to provide reconditioned solvent for cleaning successive batches of soiled fabrics and clothing.

In an effort to remove such impurities from drycleaning solvents, it has been suggested that the formulations used as the solvents be distilled after the drycleaning operation; however, distillation is normally expensive and sometimes difficult to conduct without costly equipment, and problems arise in some instances because of the loose additives present in the drycleaning mixtures.

Another suggested solution for the removal of the impurities from the solvents is by a filtration and absorption technique wherein the impurities are selectively removed from the solvents after the same have been used to clean soiled fabrics. However, the use of such techniques is disadvantageous in that equipment cost becomes high, and other mechanical problems with respect to the apparatus prevent this method from being effectively conducted. In addition, the loose additives which may be present in the drycleaning formulation may tend to inhibit effective filtration and absorption.

Also suggested is the addition of water to common formulations of drycleaning mixtures in order to improve the drycleaning characteristics of the solvents employed for the cleaning operations. Normally, water would be added to drycleaning solvents to enable the solvents to dissolve water soluble components of stains on fabrics or clothing. However, most modern fabrics are non-wettable and the presence of water, even in small amounts, prevents the organic solvents, which are generally non-polar in nature, from dissolving slightly polar stains, such as fats, etc. in the solvents since the stains become hydrated through dipole-dipole bonding with the water molecules.

During the drycleaning operation, the relative humidity of the solvent changes according to the humidity of the ambient air and that present in the fabric or clothing being cleaned. Normally the relative humidity of the solvents is maintained at about 65-70% in order to dissolve for example salts and sugars from stains. However, the control of the amount of moisture which is present in organic drycleaning solvents is very important since serious problems are encountered if the amount of moisture in the solvents becomes either too high or too low.

Too much moisture in drycleaning solvents may result in fiber shrinkage or distortion, the dulling of colors of the fabrics or clothing being cleaned and possible fading of the fabrics. In addition, fabrics become harder to press following cleaning. Too low a moisture level in the solvent results in the redepositing of water-soluble substances on the fabrics or clothing being cleaned; with the result that the stains cannot effectively be removed. Further, a low moisture content in the drycleaning solvent may result in carbon being redeposited on the fabric, thereby adversely affecting the color of the fabric and leaving the fabric with static electricity charges which make it uncomfortable for a person subsequently to wear the clothing: in addition, the presence of static electricity charges present a danger of explosion with certain types of solvents.

In addition to the problems inherent in the use of drycleaning solvents containing too much or too little moisture, other problems are apparent due to the presence of impurities; such as sulfur and other reducing agents in drycleaning solvents. Such impurities may deposit on the fibers of the clothing being cleaned, resulting in discoloration and spotting thereof, or their presence in the solvents may result in fading of the colors of the fabrics being cleaned, may cause odors to remain on the cleaned products, and in addition, especially with respect to sulfur impurities, may cause corrosion of the equipment being used to clean the material.

Accordingly, it would be desirable to very strictly control the moisture content of drycleaning solvents in order to prevent adverse static electricity effects. Further, it would be desirable to remove impurities such as sulfur from drycleaning solvents in order to make the drycleaning process more effective and to prevent adverse effects such as color fading and corrosion of the equipment employed in the drycleaning operation.

In the inventor's U.S. Pat. No. 3,766,075, an invention is disclosed whereby residual moisture and impurities contained in typical formulations of drycleaning solvents are removed without some of the above-discussed adverse effects, by adding an unsubstituted aromatic hydrocarbon or a halogen- or alkyl-substituted aromatic hydrocarbon together with a dried cellulosic material onto which has been precipitated a fine deposit of an organic drycleaning solvent. The treated cellulosic material is disclosed in that patent as absorbing excess moisture present in the solvent mixture as well as removing impurities therefrom through oxidation by means of an employed dichromate. In U.S. Pat. No. 4,077,878, an improvement in the aforesaid process is disclosed wherein the dichromate compound is precipitated onto a dried cellulosic material which is contained in a permeable cellulosic bag. The bag is electrically grounded by attaching a wire thereto or the bag is attached to a ground via a DC power supply.

In the inventor's U.S. Pat. No. 4,193,765, an invention is disclosed whereby residual moisture and sulfur and other residual reducing agent impurities contained in drycleaning solvents are removed by adding to the solvents an unsubstituted aromatic hydrocarbon or a halogen or alkyl-substituted aromatic hydrocarbon and circulating the hydrocarbon-containing solvent through a filter system comprising two filters; one filter containing a solid acid and the other containing a chromate compound. This invention was an improvement on U.S. Pat. No. 4,077,878.

In one aspect the present invention is a further improvement on the drycleaning method disclosed in U.S. Pat. No. 4,193,765.

In the area of removing impurities and residual moisture from petroleum fuels, presently, many of the efforts to reduce the air pollution produced by the automobile engine have centered around treating the exhaust rather than pre-treating the fuel to reduce the toxic emissions. The catalytic converter, for example, treats the engine exhausts immediately before releasing them to the atmosphere. Many pollution control systems also rely upon recirculating the engine exhaust back to the engine for a "second burn" before releasing them to the atmosphere to reduce pollutants. Until the inventor's U.S. Pat. No. 4,211,639 the prior art did not provide a suitable treatment for the fuel itself, prior to burning, whereby the toxic emissions could be held to a minimum.

U.S. Pat. No. 4,211,639 provides a treatment for petroleum fuels, such as crude oil, gasoline jet fuel, diesel fuel, fuel oils and like petroleum products, whereby the toxic emissions produced on burning those materials are reduced.

In U.S. Pat. No. 4,211,639, petroleum fuels are treated with a solid acid and a chromate compound, whereby sulfur and other residual impurities are removed, with the result that toxic emissions, such as carbon monoxide and hydrocarbons, can be reduced. While the explanation as to how these toxic emissions are reduced is not completely clear, sizable reductions in carbon monoxide and hydrocarbon emissions have been observed.

Thus, in another aspect, the present invention is an improvement on the emissions-reducing method disclosed in U.S. Pat. No. 4,211,639.

SUMMARY OF THE INVENTION

Accordingly, it is an object of the present invention to provide a novel catalyst composition which is useful in removing impurities and/or residual moisture from various sources containing them.

It is also an object of the present invention to provide improved drycleaning compositions free of residual moisture and impurities, without the adverse effects discussed above using the novel catalyst.

Another object of the present invention is to provide improved drycleaning compositions which speed cleaning by use of the novel catalyst.

Yet another object of the present invention is to provide drycleaning compositions which allow for a longer life for the drycleaning filter and the carbon in that filter.

Further, it is an object of the present invention to provide an improved treatment for petroleum fuels, such as crude oil, gasoline, jet fuel, fuel oils, and like petroleum products, whereby the toxic emissions produced on burning those materials are reduced by use of the novel catalyst.

The above and other objects and advantages of the present invention are satisfied by a catalyst composition for removing impurities and/or residual moisture from a source containing them comprising a mixture of a) solid barium chromate; and b) solid fumaric acid The catalyst composition of the present invention is particularly useful in removing impurities and residual moisture from such sources as organic drycleaning solvents and petroleum fuels, but is not limited to those sources.

The catalyst of the present invention can be used in a method for removing impurities and/or residual moisture from an organic drycleaning solvent by use of this new catalyst comprising in sequence:

(a) adding to said solvent an unsubstituted or halogen- or alkyl-substituted aromatic hydrocarbon;

(b) circulating said aromatic hydrocarbon-containing solvent through a filter after contact with clothes to be dry cleaned, said filter comprising water-dampened cellulosic material, said cellulosic material containing a catalyst composition comprising a mixture of solid fumaric acid and solid barium chromate: and (c) electrically grounding said filter apparatus during operation of the process.

The catalyst of the present invention can also be used in a method for removing impurities and/or residual moisture from a petroleum fuel comprising:

(a) circulating said fuel through a first filter apparatus made up of a cellulosic material containing a catalyst composition comprising a mixture of solid fumaric acid and solid barium chromate; and (b) circulating said fuel from step (a) through a second filter apparatus containing a cellulosic material containing water; and (c) during steps (a) and (b) maintaining an electric grounding of said first filter apparatus via a DC power supply placed in between said filter and second filters.

DETAILED DESCRIPTION

The catalyst composition of the present invention comprises a mixture of solid fumaric acid and solid barium chromate. The composition comprises any ratio of solid fumaric acid to solid barium chromate, but it is generally preferred that the composition contain an excess of solid fumaric acid on a weight basis. The most preferred composition comprises about 5 parts by weight of solid fumaric acid to about 1 part by weight of solid barium chromate.

In addition, any commonly known method can be used to mix the solid fumaric acid and solid barium chromate together. For example, both the compounds can be placed in a ball mill and ground together until a relatively fine particle size composition is obtained.

The amount of the catalyst to be used is not critical, and depends upon the source Which the impurities and residual moisture are to be removed from.

The novel catalyst composition is illustrated with further particularity below with reference to two practical embodiments: treatment of an organic drycleaning solvent, and treatment of a petroleum fuel.

ORGANIC DRYCLEANING SOLVENT EMBODIMENT

In my co-pending application Ser. No. 07/308,590 filed Feb. 10, 1989, a drycleaning assembly and method for removing impurities and residual moisture from an organic drycleaning solvent is disclosed. In that application, various catalyst compositions are disclosed as useful for removing impurities and residual moisture from the solvent. The present invention, however, represents an improvement over such method in that a particular catalyst composition, solid barium chromate/solid fumaric acid, has been determined to be surprisingly superior to the catalysts disclosed in my prior application in terms of its ability to remove impurities and residual moisture. The following is a description of the general assembly and method disclosed in my prior application, but with reference to the novel catalyst of the present invention.

Figure 1:
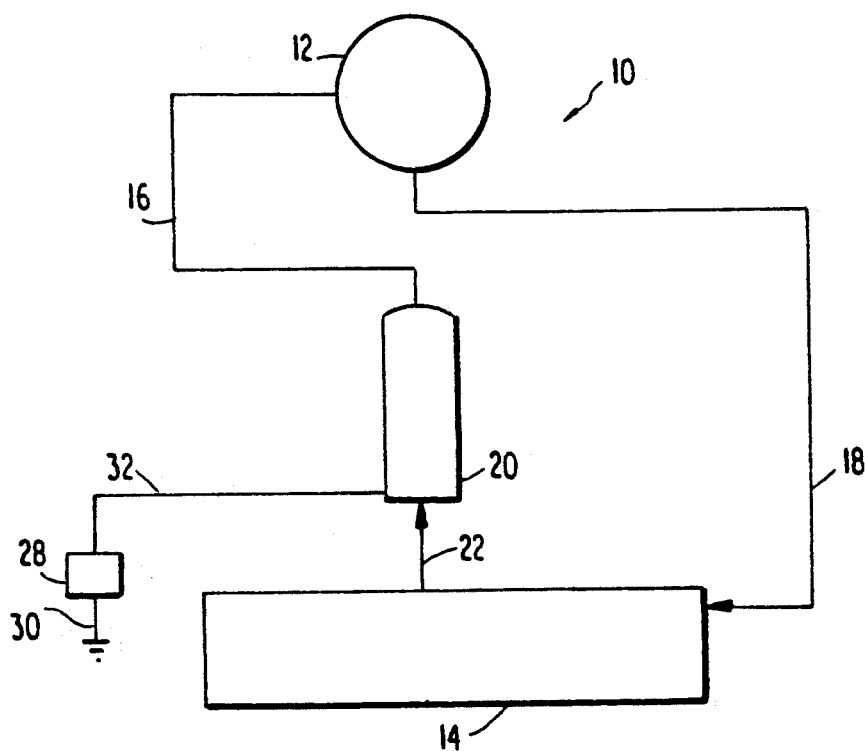
FIG. 1 is a schematic diagram which illustrates a drycleaning system based on the present invention.

Referring to the drawings. FIG. 1 shows a cleaning assembly 10 including a cleaning drum 12 which receives articles to be cleaned and a base tank 14 for the drycleaning solvent. The present invention's catalyst is applicable to any type of organic drycleaning solvent normally employed in drycleaning operations. Many types of solvents are well-known in the art, as indicated by the above discussion: and those of ordinary skill in the art will realize that the efficacy of the present invention is not limited to a certain class of organic drycleaning solvents. Preferably, the solvents which are employed in the present invention are aliphatic halogen-substituted hydrocarbons, or more preferably, petroleum solvents having a boiling point in the range of from about 100°–400° F. and a surface tension of from about 20 to about 30 dynes/cm at 20° C. Typical examples of such halogen-substituted aliphatic hydrocarbons are trichlorotrifluoroethane, carbon tetrachloride, perchloroethylene, and the like. Typical suitable petroleum solvents are mineral spirits, petroleum ethers, methylisobutylketone, and the like. It is to be specially understood, that the present invention is especially applicable to any petroleum solvent having the above properties.

The present invention contemplates adding to such organic drycleaning solvents an unsubstituted aromatic hydrocarbon having a boiling point between about 78° and about 250° C. Typical examples of suitable unsubstituted aromatic hydrocarbons are benzene and naphthalene. Suitable alkyl-substituted aromatic hydrocarbons are lower alkyl, preferably methyl- or ethyl-substituted aromatic hydrocarbons, such as xylene, toluene, and the like. Further, suitable halogen-substituted aromatic hydrocarbons are chlorobenzene and the like. However, the present invention is expressly applicable to those compounds satisfying the above property, although not specifically enumerated in the present specification. Those of ordinary skill in the art, with a minimum degree of experimentation, are certainly able to practice the present invention using aromatic compounds having the necessary boiling point but not specifically identified herein, according to the end use desired.

Generally, the amount of the above-identified aromatic compound which is incorporated into the organic drycleaning solvent composition varies from 3 liquid ounces to one gallon of aromatic compound per 100 gallons of organic solvent. The particular amount of a specific aromatic hydrocarbon may vary within this range, depending upon the aromatic hydrocarbon selected; however, an amount of aromatic hydrocarbon within this range is generally suitable for the purposes of the present invention.

The drycleaning drum 12 is provided with an inlet conduit 16 and an outlet conduit 18 which form means for circulating the drycleaning solvent into the drum 12 and back to the storage tank 14. The unit also includes a pump, not shown, for urging the drycleaning solvent into the drum and a motor for rotating the drum. A gear assembly of a conventional type may be utilized for varying the speed of the drum as controlled by the timer. Such assemblies are individually well-known and of conventional type.

Filter 20 comprises water-dampened cellulosic material, which material contains the catalyst composition of the present invention. The cellulosic material is made up of a permeable cellulosic material such as cotton cloth. However, the skilled artisan could construct the cellulosic material out of any available cellulosic fabric. The cellulose material can be folded upon itself so as to be closed and thereby form a bag. Bags of this type are described in U.S. Pat. No. 4,077,878, which is incorporated herein by reference. The catalyst composition may be contained within the bag directly or the catalyst composition may be precipitated upon a second piece of cellulosic material which is placed in the cellulosic bag. In the alternative, the filter itself may be constructed of cellulosic board.

Water is contained in very small quantities in the cellulosic material of the filter. The cellulosic material should contain enough water to be damp but not dripping wet.

Filter 20 is interconnected to the base tank via inlet conduit 22. The construction of filter 20 is not critical, it is only necessary that the arrangement permit the solvent to contact the solid fumaric acid-solid barium chromate catalyst without carrying substantial portions of the compound into the drycleaning drum.

In accordance with the present invention the catalyst composition must be grounded. When the filter container 20 is formed of a metallic material, the ground can be accomplished by grounding the filter assembly itself. Of course, if the filter container is plastic or constructed of some non-conductive material, the ground can be established by having the wire lead from some metallic point (e.g., the cleaning drum) into inside the filter container. FIG. 1 shows one embodiment of the present invention wherein filter 20 is metallic and the filter assembly itself is grounded via a DC power supply 28. The positive terminal of the DC power supply is connected to wire 30 leading to the ground and the negative terminal is connected to the filter by wire 32.

The amount of solid fumaric acid-solid barium chromate catalyst contained in the filter is not critical. One of the advantages of the present invention is that practically any amount of solid fumaric acid-solid barium chromate catalyst will remain active for the life of the drycleaning solvent. This is because the amount of residual moisture and impurity in the drycleaning solvent is small in comparison to the amount of solid fumaric acid-solid barium chromate catalyst which can be held in the filter arrangement and only the residual moisture in the solvent dissolves the solid fumaric acid-solid barium chromate catalyst.

It is most preferred that the total weight of the mixture of solid fumaric acid-solid barium chromate catalyst be 3 ounces.

The solid fumaric acid-solid barium chromate catalyst used in the present invention must be electrically grounded. As indicated above, this ground can be accomplished by one of several means. If the solid fumaric acid-solid barium chromate catalyst is contained directly within a metallic filter arrangement, the filter itself may be grounded. If the filter apparatus is not metallic, however, the ground may be established by introducing a wire to the outside of the filter container. If the solid fumaric acid-solid barium chromate catalyst is contained within the cellulosic bag, as described above, the ground can be enhanced by attaching a copper wire to the cellulosic bag within the filter apparatus. If the filter apparatus is metallic, the ground is established by merely allowing the copper wire attached to the cellulosic bag to contact the inside of the filter container. However, if the filter container is not metallic, the ground can be established by connecting the wire attached to the cellulosic bag directly to a ground.

The present invention can also be practiced using a DC power supply. When the aromatic hydrocarbon added to the drycleaning solvent is naphthalene, the DC power supply is not necessary. However, even when naphthalene is used, the DC power supply will not detract from the advantages obtained in accordance with the present invention. When a DC power supply is used, the negative terminal of the power supply is connected to the filter containing the solid fumaric acid-solid barium chromate catalyst and the positive terminal of the power supply is connected to a ground.

It has been determined that by adding the aromatic hydrocarbon to the drycleaning solvent and contacting the solvent with a solid fumaric acid-solid barium chromate catalyst as in the present invention, residual moisture in the drycleaning solvent is effectively removed.

It is known that at extremely low humidities, carbon becomes redeposited on the clothes being cleaned, resulting in adverse static electricity effects. However, the drycleaning system of the present invention removes large amounts of soil without redeposition on the clothing being observed. Further, the adverse static electricity effects noticed when known compositions are employed at low humidities are substantially eliminated by the present invention and therefore, the wearer of the clothing, after cleaning, does not experience uncomfortable effects therefrom, and in addition, the reduction of static electricity charges in the clothing reduces any explosion hazard which may exist, depending upon the particular solvent employed.

The use of the instant drycleaning system results in extremely uniform cleaning, without the adverse effects of shrinkage, color fading, dullness of colors. etc. In addition, stains comprised of carbon, salt, sugar, fats, etc. in the clothes being cleaned are substantially completely removed from the clothes without any adverse effects. Thus, the present invention provides an improved drycleaning composition which enables those skilled in the art to achieve extremely uniform drycleaning operations without the adverse effects of the prior art.

It is believed that the catalyst composition of the present invention absorbs the residual water in the drycleaning solvent and removes the impurities, such as sulfur compounds, from the drycleaning solvent by oxidizing the same to sulfite or sulfate, which then are removed by dissolving the same in the water absorbed in the catalyst.

It is believed that the greatly improved drycleaning compositions are achieved in the following manner. The fumaric acid, which is a powerful reducing agent, reduces barium chromate, which thereupon acts as a powerful oxidizing agent which cleans the drycleaning solvent. Thus, powerful oxidation and reduction occur simultaneously. To control and moderate this simultaneous oxidation and reduction, the deuterium oxide preferably is present and acts as a moderator.

It has further been found that the addition to the solvent of from about 0.5%–5%. by weight, based on the weight of the organic drycleaning solvent, of a hydrocarbon of a high boiling point, such as white oil or mineral oil, helps remove static and increases the ease of removal of carbon, salt and sugar deposits from the clothes in the drycleaning process. One type of useful white oil is Chevron No. 72, which is a well-known technical oil.

TREATMENT OF PETROLEUM FUEL EMBODIMENT

In my co-pending application Ser. No. 07/308,591 filed Feb. 10, 1989, a method for removing impurities and residual moisture from petroleum fuels is disclosed. In that application, various catalyst compositions are disclosed as useful for removing impurities and residual moisture from the fuel. The present invention, however, represents an improvement of such method in that a particular catalyst composition, solid barium chromate/solid fumaric acid, has been determined to be surprisingly superior to the catalysts disclosed in my prior application in terms of its ability to remove impurities and residual moisture from the fuel. The following is a description of a general embodiment of the method disclosed in my prior application, but with reference to the novel catalyst of the present invention.

In regard to using the catalyst in removing impurities and residual moisture from petroleum fuels, generally, the present invention is applicable to any type of petroleum fuel product, fuel oils (including number a through number b fuel oils) diesel fuel, jet fuel, gasoline and like products. The present invention is particularly applicable to gasolines in the form they are generally supplied to the consumer regardless of their octane rating and whether they are lead-free or not. The phrase "petroleum fuel" will be used herein to generally define the above types of petroleum fuel products, but is not to be construed as limiting the types of fuel to be treated by the catalyst of the present invention.

Figure 2:
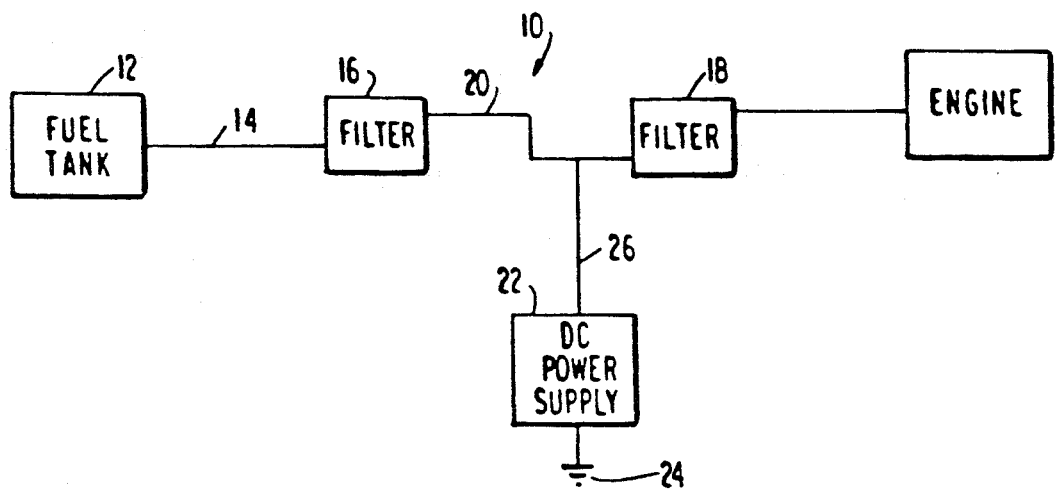
FIG. 2 is a schematic diagram which illustrates a one fuel treatment system based on the present invention.

One embodiment of the present invention is illustrated in FIG. 2. As will become more clear from the discussion which follows, this embodiment is a two-filter arrangement where the solid fumaric acid-solid barium chromate catalyst is contained in the first filter (16) canisters.

The second filter (18) is made up of a cellulosic material and contains water, which acts as a moderator. Inbetween the two filters is a DC power supply which acts as a ground.

Referring now to FIG. 2, the system itself is designated 10. and the fuel tank 12 is provided with fuel line 14. The unit also includes a conventional fuel pump (not shown). A first filter assembly 16 is incorporated in the system 10 for containing the fuel with the solid fumaric acid-solid barium chromate catalyst. The construction of the filter assembly is not critical, the essential requirement being that the filter either be constructed of a cellulose material or contain some cellulose material, such as the cotton bag discussed below, to provide an arrangement whereby the fuel may pass through the filter assembly and contact the solid fumaric acid-solid barium chromate catalyst without substantially removing the compounds from the assembly. Generally, the filter may be cylindrical in form and constructed of an imperforate casing having a filter container inlet and a filter container outlet.

Filter 16 is interconnected to the fuel tank via fuel line 14 and to filter 18 via the portion of fuel line designated 20. After contacting the solid fumaric acid-solid barium chromate catalyst in the filter 16, the fuel circulates out of filter 16 to conduit 20 where it is carried to filter 18. Filter 18 is made up of a cellulosic material and contains water. The water acts as a moderator; the greater the content of deuterium oxide ($D_2O$, heavy water) in the water, the more efficient the moderation. From there, the fuel passes to the engine (as shown in FIG. 2) or to a fuel burner.

Again, the construction of the filters is not critical, it is only necessary that the arrangement permit the fuel to contact the compounds or the catalyst without carrying substantial portions of the compound or the catalyst into the fuel line and, as discussed below, that the filter be provided with some cellulosic material.

In accordance with the present invention, the filter system must be grounded. When the filters are formed of a metallic material, the ground may be accomplished automatically by the contact between the filter and the metal in the car. Of course, the filter assemblies themselves can be grounded directly. If the filter containers are plastic or constructed of some non-conductive material, the ground can be established by having the wire lead from some metallic point on the car into the inside of the filter container. FIG. 2 shows that embodiment of the present invention wherein the filters are metallic and the assembly is grounded via a DC power supply 22. The positive terminal of the DC power supply is connected to wire 24 leading to the ground and the negative terminal is connected to the filter by wire 26.

Electrical circuit breakers 27 and 28 are placed, respectively, in front of first filter 16 after filter 18.

It is essential that the filter(s) contain some cellulosic material.

The solid fumaric acid-solid barium chromate catalyst may be placed inside the filter canisters in a bag made of a permeable cellulosic material such as cotton cloth. The cellulosic container device described in the inventor's U.S. Pat. No. 4,077,878 relating to cleaning drycleaning solvents may also be used in the filter. In the alternative, the filter itself may be constructed of cellulosic board.

In the present invention an unsubstituted aromatic hydrocarbon or a halogen- or alkyl-substituted aromatic hydrocarbon having a boiling point between about 78° and 250° C. may optionally be added to the fuel. Typical examples of suitable unsubstituted aromatic hydrocarbons are benzene and naphthalene. Suitable alkyl-substituted aromatic hydrocarbons are lower alkyl, preferably methyl- or ethyl-substituted aromatic hydrocarbons, such as xylene, toluene, and the like. Further, suitable halogen-substituted aromatic hydrocarbons are chlorobenzene and the like. However, the present invention is expressly applicable to those compounds satisfying the above property, although not specifically enumerated in the present specification. Those of ordinary skill in the art, with a minimum degree of experimentation, are certainly able to practice the present invention using an aromatic compound having the necessary boiling point but not specifically identified herein, according to the end use desired.

Generally, the amount of the above-identified aromatic compound which is incorporated into the fuel varies from 3 liquid ounces to 1 gallon of aromatic compound per 100 gallons of fuel. The particular amount of a specific aromatic hydrocarbon may vary within this range, depending upon the aromatic hydrocarbon selected, however, an amount of aromatic hydrocarbon within this range is generally suitable for the purposes of the present invention.

The amount of solid fumaric acid-solid barium chromate catalyst contained in the first filter is not critical. One of the advantages of the present invention is that practically any amount of solid fumaric acid-solid barium chromate catalyst will remain active for the life of an automobile or other burner, This is because the amount of residual moisture and impurity in the fuel is small in comparison to the amount of catalyst which can be held in the filter arrangement and only the residual moisture in the fuel dissolves the solid fumaric acid-solid barium chromate catalyst.

As indicated above, the present invention also requires the presence of a cellulosic material device in the filters. The cellulosic bag device described above comprises a cellulose material which can be folded upon itself so as to be closed and thereby form a bag. Cotton cloth is a good example of one such cellulosic material. However, the skilled artisan could construct the cellulosic bag out of any available cellulosic fabric. The solid fumaric acid-solid barium chromate catalyst may be contained within the bag directly or precipitated upon a second piece of cellulosic material which is placed in the cellulosic bag. Bags of this type are described in the inventor's U.S. Pat. No. 4,077,878, which is incorporated herein by reference. If the mixture of the catalyst is contained within the cellulosic bag, as described above, the ground can be established by attaching a copper wire to the cellulosic bag within the filter apparatus. If the filter apparatus is metallic, the ground is established by merely allowing the copper wire attached to the cellulosic bag to contact the insides of the filter container. However, if the filter container is not metallic, the ground can be established by connecting the wire attached to the cellulosic bag directly to a ground.

The fuel treatment embodiment of the present invention can also be practiced using a DC power supply. When the aromatic hydrocarbon added to the fuel is naphthalene, the DC power supply is not necessary. However, even when naphthalene is used, the DC power supply will not detract from the advantages obtained in accordance with the present invention. When a DC power supply is used, the negative terminal to the power supply is connected to the system in between the first and second filters, and the positive terminal of the power supply is connected to a ground.

It has been determined that by adding the aromatic hydrocarbon to the fuel and contacting the fuel with a solid fumaric acid-solid barium chromate catalyst as in the present invention, the sulfur and residual moisture in the fuel are effectively removed.

It is believed that catalyst used in the present invention ionizes and absorbs the residual water in the fuel and remove sulfur compounds from the fuel by oxidizing the same to sulfite or sulfate.

It is also believed that the water in the second filter acts as a moderator.

The above description should not be taken as limiting the present invention to the actual embodiments specifically disclosed, but should be deemed to describe the equivalence thereof which may be employed in the practice of the present invention. Those of ordinary skill in the art may make suitable uses and modifications of the present invention, according to the above description, without departing from the scope thereof.

What is claimed is:

1. A method for removing impurities and/or residual moisture from an organic drycleaning solvent comprising in sequence:
    (a) adding to said solvent an unsubstituted or halogen- or alkyl-substituted aromatic hydrocarbon;
    (b) circulating said solvent containing the aromatic hydrocarbon through a filter after contact with clothes to be dry cleaned, said filter comprising cellulosic material, that is dampened with water, but is not dripping wet, said cellulosic material containing a catalyst composition comprising a mixture of solid fumaric acid and solid barium chromate, and
    (c) electrically grounding said filter during operation of the method.

2. The method of claim 1 wherein said aromatic hydrocarbon is naphthalene.

3. The method of claim 1, wherein said mixture comprises about 5 parts by weight of said solid fumaric acid and about 1 part by weight of said solid barium chromate.

4. The method of claim 1, wherein said catalyst in said filter is 3 ounces by weight.

5. The method of claim 1, wherein said collulosic material is a permeable cotton bag having one end of a wire connected thereto, and other end of said wire being directly or indirectly in contact with an electrical ground.

6. The method of claim 1, further comprising the step of adding mineral oil to said solvent, wherein the mineral oil is added in an amount of from about 0.5%–5%, by weight, based on the weight of said solvent.

* * * * *